US007641835B2

(12) United States Patent
Ramsey et al.

(10) Patent No.: US 7,641,835 B2
(45) Date of Patent: Jan. 5, 2010

(54) TRASHCAN HAVING IMPROVED BAG RETENTION MEMBER

(75) Inventors: Franklin M. Ramsey, Charlotte, NC (US); Daniel Lee Bizzell, Davidson, NC (US); Tom J. Philpott, Charlotte, NC (US); Ian D. Kovacevich, Charlotte, NC (US); Matthew Wynn, Charlotte, NC (US)

(73) Assignee: Edison Nation, LLC, Charlotte, NC (US)

( * ) Notice: Subject to any disclaimer, the term of this patent is extended or adjusted under 35 U.S.C. 154(b) by 451 days.

(21) Appl. No.: 11/424,968

(22) Filed: Jun. 19, 2006

(65) Prior Publication Data

US 2007/0034334 A1 Feb. 15, 2007

Related U.S. Application Data

(60) Provisional application No. 60/595,866, filed on Aug. 11, 2005, provisional application No. 60/595,920, filed on Aug. 16, 2005.

(51) Int. Cl.

| | |
|---|---|
| ***B29C 43/00*** | (2006.01) |
| ***B29C 65/00*** | (2006.01) |
| ***B29C 45/00*** | (2006.01) |
| *B65D 1/12* | (2006.01) |

(52) U.S. Cl. .................. 264/260; 220/495.08; 220/676

(58) Field of Classification Search ............ 220/495.08, 220/676; 264/260

See application file for complete search history.

(56) References Cited

U.S. PATENT DOCUMENTS 3,057,016 A * 10/1962 Schilling .................... 264/250

(Continued)

FOREIGN PATENT DOCUMENTS

EP 582240 2/1994

(Continued)

OTHER PUBLICATIONS

Exhibits A, B1, B2, C1, and C2, and corresponding descriptions thereof, as set forth in the Information Disclosure Statement filing by Applicant on Dec. 12, 2006.

(Continued)

*Primary Examiner*—Philip C Tucker
*Assistant Examiner*—Alison Hindenlang
(74) *Attorney, Agent, or Firm*—Chad D. Tillman; James D. Wright; Tillman Wright, PLLC

(57) ABSTRACT

A trashcan includes a container having a base and a peripheral wall extending upwardly from the base forming an interior space for receipt of a trash bag therein; and a trash bag retention member disposed on the peripheral wall, the retention member defining a passageway into the interior space of the container and comprising a plurality of resilient, flexible fingers configured to receive and retain therebetween a portion of a trash bag. Each finger includes a portion thereof that extends away from the peripheral wall. Each finger is "bent" and extends away from the peripheral wall. A finger may extend away from the peripheral wall on the exterior of the container, away from the peripheral wall on the interior of the container, or both. A method of making the trashcan includes injection molding the container and the retention member separately or, alternatively, together.

16 Claims, 17 Drawing Sheets

U.S. PATENT DOCUMENTS

| | | | | |
|---|---|---|---|---|
| 3,522,922 | A | 8/1970 | Byron | |
| 3,538,595 | A * | 11/1970 | Barnes | 29/511 |
| 3,825,150 | A | 7/1974 | Taylor | |
| 4,338,979 | A | 7/1982 | Dow | |
| 4,457,483 | A | 7/1984 | Gagne | |
| 4,535,911 | A | 8/1985 | Goulter | |
| 4,570,304 | A | 2/1986 | Montreuil et al. | |
| 4,576,310 | A * | 3/1986 | Isgar et al. | 220/495.1 |
| 4,644,610 | A * | 2/1987 | Fish | 24/30.5 S |
| 4,664,347 | A | 5/1987 | Brown et al. | |
| 4,763,808 | A | 8/1988 | Guhl et al. | |
| 4,834,260 | A | 5/1989 | Auten | |
| 4,884,717 | A | 12/1989 | Bussard et al. | |
| 4,923,087 | A | 5/1990 | Burrows | |
| 4,962,523 | A | 10/1990 | Bieltved | |
| 5,031,793 | A | 7/1991 | Chen et al. | |
| 5,065,891 | A | 11/1991 | Casey | |
| 5,100,087 | A | 3/1992 | Ashby | |
| 5,193,713 | A | 3/1993 | Greathouse et al. | |
| 5,222,704 | A | 6/1993 | Light | |
| 5,261,553 | A | 11/1993 | Mueller et al. | |
| 5,314,151 | A | 5/1994 | Carter-Mann | |
| 5,419,452 | A | 5/1995 | Mueller et al. | |
| D362,525 | S | 9/1995 | Kruger | |
| D365,427 | S | 12/1995 | Brightbill | |
| 5,501,358 | A | 3/1996 | Hobday | |
| 5,598,942 | A | 2/1997 | Cowie | |
| 5,611,507 | A | 3/1997 | Smith | |
| 5,628,424 | A | 5/1997 | Gola | |
| 5,632,401 | A | 5/1997 | Hurd | |
| 5,636,416 | A | 6/1997 | Anderson | |
| D381,159 | S | 7/1997 | Hampton | |
| 5,645,186 | A | 7/1997 | Powers et al. | |
| 5,690,247 | A | 11/1997 | Boover | |
| D387,530 | S | 12/1997 | Doxey | |
| 5,695,088 | A | 12/1997 | Kasbohm | |
| 5,704,511 | A | 1/1998 | Kellams | |
| 5,730,312 | A | 3/1998 | Hung | |
| 5,732,845 | A | 3/1998 | Armaly, Jr. | |
| 5,735,495 | A | 4/1998 | Kubota | |
| 5,738,239 | A | 4/1998 | Triglia | |
| D399,622 | S | 10/1998 | Rashid | |
| D400,331 | S | 10/1998 | Rausch | |
| 5,816,431 | A | 10/1998 | Giannopoulos | |
| D401,383 | S | 11/1998 | Gish | |
| D401,719 | S | 11/1998 | Van Leeuwen et al. | |
| 5,881,901 | A | 3/1999 | Hampton | |
| 5,887,748 | A | 3/1999 | Nguyen | |
| 5,987,708 | A | 11/1999 | Newton | |
| 6,123,215 | A | 9/2000 | Windle | |
| 6,126,031 | A | 10/2000 | Reason | |
| 6,161,263 | A * | 12/2000 | Anderson | 24/545 |
| 6,234,339 | B1 | 5/2001 | Thomas | |
| D445,980 | S | 7/2001 | Tjugum | |
| 6,276,557 | B1 * | 8/2001 | Wysocki | 220/608 |
| 6,286,706 | B1 | 9/2001 | Tucker | |
| 6,557,716 | B1 | 5/2003 | Chan | |
| 6,568,555 | B1 | 5/2003 | LoCascio | |
| 6,659,407 | B2 | 12/2003 | Asaro | |
| 6,681,950 | B2 | 1/2004 | Miller, Jr. et al. | |
| D521,203 | S | 5/2006 | Sofy | |
| 7,080,750 | B2 | 7/2006 | Wein et al. | |
| 7,243,811 | B1 | 7/2007 | Ramsey | |
| 7,404,499 | B1 | 7/2008 | Ramsey | |
| 2001/0002690 | A1 | 6/2001 | Rosky | |
| 2002/0096524 | A1 | 7/2002 | Hardesty | |
| 2003/0089719 | A1 | 5/2003 | Berger | |
| 2004/0177817 | A1 * | 9/2004 | Bradenbaugh | 122/13.01 |
| 2004/0200938 | A1 | 10/2004 | Forlivio | |
| 2005/0017010 | A1 | 1/2005 | Siegel et al. | |
| 2006/0056741 | A1 | 3/2006 | Yang et al. | |
| 2007/0289972 | A1 | 12/2007 | Wynn et al. | |
| 2008/0011754 | A1 | 1/2008 | Ramsey | |
| 2008/0011910 | A1 | 1/2008 | Ramsey | |
| 2008/0257889 | A1 | 10/2008 | Kovacevich et al. | |
| 2008/0257890 | A1 | 10/2008 | Kovacevich et al. | |
| 2008/0257891 | A1 | 10/2008 | Kovacevich et al. | |
| 2008/0264948 | A1 | 10/2008 | Kovacevich et al. | |
| 2008/0264950 | A1 | 10/2008 | Kovacevich et al. | |
| 2008/0272127 | A1 | 11/2008 | Kovacevich et al. | |

FOREIGN PATENT DOCUMENTS

| | | | |
|---|---|---|---|
| KR | 200208499 | Y1 | 1/2001 |
| KR | 20020092090 | | 12/2002 |

OTHER PUBLICATIONS

"International Search Report" and "Written Opinion of the International Search Authority" (Korean Intellectual Property Office) in Pressix Technologies, LLC et al. International Patent Application Serial No. PCT/US2008/055203 corresponding to current U.S. patent application, dated Aug. 31, 2008, 12 pages.

Information Disclosure Statement (IDS) Letter Regarding Common Patent Applications(s), submitted by Applicant on Feb. 13, 2009.

* cited by examiner

TRASHCAN HAVING IMPROVED BAG RETENTION MEMBER

I. CROSS-REFERENCE TO RELATED APPLICATIONS

The present application is a nonprovisional of, and claims priority under 35 U.S.C. § 119(e) to, each of: Ramsey U.S. Provisional Patent Application No. 60/595,868, filed Aug. 11, 2005; and Ramsey U.S. Provisional Patent Application No. 60/595,920, filed Aug. 16, 2005. The entire disclosure of each of these patent applications is hereby incorporated herein by reference.

II. COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

III. BACKGROUND OF THE INVENTION

A trashcan is a commonly used device. In general, a trash bag is inserted into a trashcan for collection of trash items and debris and is then removed and disposed of when the trash bag becomes full. A typical trash bag is made of a pliable, relatively thin plastic and has a bottom and a top edge that defines an opening. When the trash bag is placed in a trashcan, typically the top edge is folded over a rim of the trashcan for holding the trash bag in place and for keeping the rim of the trashcan clean.

Unfortunately, a common problem that occurs with conventional trashcans and the trash bags used therein is that often the trash bag falls into the trashcan when a relatively heavy item is placed in the trash bag or when an item is tossed into the trash bag. Devices intended to alleviate the aforementioned problem are known. For example, U.S. Pat. No. 5,636,416, which is incorporated herein by reference, discloses a trashcan that has a conventional shape and includes clips that are attachable to a trash bag to retain the trash bag to the trashcan. Another clip assembly for securing a trash bag to a trashcan is disclosed in U.S. Pat. No. 5,645,186, which also is incorporated herein by reference. A drawback to these devices is that the clip assemblies are complicated in design and include components pivotally connected to one another. The requirement of separate components operatively connected together for pivotal movement also may tend to increase manufacturing costs.

A simple design for retaining a trash bag to a trashcan that overcomes the disadvantages of such a clip assembly is disclosed in U.S. Patent Application Publication No. US 2006/0056741 A1 ("Yang"), which is incorporated by reference herein. Yang discloses a mechanism for securing a trash bag to a wall (12) of a container (10) comprising an opening (18) in the body of the container below an upper rim (16) thereof. The securing mechanism includes fins (24) that are spaced apart and that extend into the opening to define a generally oblong, horizontally oriented opening. The fins are flexible, whereby a portion of the bag that is inserted through the opening is clipped between the flexible fins and thereby secured to the container. Yang further discloses that the fins may be made from the same material as the container (10) or from a different material to provide different degrees of flexibility, although Yang fails to disclose the design or manufacture of a container having fins made from a material that is different from the wall of the container.

The present invention is believed to represent one or more improvements over the securing mechanism disclosed in Yang.

IV. SUMMARY OF THE INVENTION

The present invention includes many aspects and features.

In an aspect of the present invention, a trashcan includes: a container having a base and a peripheral wall extending upwardly from the base forming an interior space for receipt of a trash bag therein; and a trash bag retention member disposed on the peripheral wall, the retention member defines a passageway into the interior space of the container and comprises a plurality of resilient, flexible fingers configured to receive and retain therebetween a portion of a trash bag. Each finger includes a portion thereof that extends away from the peripheral wall. In essence, each finger is "bent" and extends away from the peripheral wall. Thus, a finger may extend away from the peripheral wall on the exterior of the container, away from the peripheral wall on the interior of the container, or both. In this latter respect, a finger preferably includes both a portion that extends away from the peripheral wall on the exterior of the container and a portion that extends toward the interior space of the container.

In a feature of this aspect, the portion of a finger that extends toward the interior space of the container extends beyond the peripheral wall within the interior space of the container.

In a feature of this aspect, a panel defines the plurality of the fingers of the trash bag retention member. In accordance with this feature, the panel is bonded directly to the peripheral wall of the container. Alternatively, the panel is bonded directly to a frame and the frame is attached to the peripheral wall of the container. The frame may be generally U-shaped and may be attached to the peripheral wall via a snap-fit connection. Additionally or alternatively, the frame may be adhered to the peripheral wall.

In further accordance with this feature, the fingers of the retention member may be symmetrically disposed within a square area of the panel.

In still further accordance with this feature, an upper edge of the panel and the peripheral wall together define a rim of the container.

In a feature of this aspect, the retention member is disposed on the peripheral wall at a distance below a rim of the container, the peripheral wall completely surrounding the retention member.

In a feature of this aspect, the fingers of the retention member define a rounded indentation for receipt therein of the fingertip of a person's finger. The rounded indentation collectively may be defined by a lip of each finger of the retention member.

In a feature of this aspect, the plurality of fingers consists of four fingers.

The four fingers may define therebetween an open space in the shape of an "X," wherein the ends of the open space are rounded or pear shaped. Additionally, each end of the open space in the shape of an "X" may comprise an opening that is approximately the size of the central opening centrally located between all of the terminal ends of the fingers.

In a feature of this aspect, each finger includes a curved portion.

In a feature of this aspect, each finger includes two curved portions.

In a feature of this aspect, the fingers of the trash bag retention member are arranged about an opening. The opening preferably comprises a circular opening and may include a diameter of a length sufficient to receive therein a person's finger without displacement of the fingers of the bag retention member. Alternatively, the circular opening may include a diameter of a length that is insufficient to receive therein a person's finger without displacement of the fingers of the bag retention member.

In a feature of this aspect, the trashcan further includes a pliable trash bag received within the container, a top of the trash bag extending over a rim of the container and being received within and retained by the retention member.

In a feature of this aspect, the trashcan further includes a plurality of retention members disposed in the peripheral wall. The plurality of retention members may be only two retention members, each disposed in a respective, opposed sidewall of the container. Furthermore, the two retention members may be disposed in mirror relation to one another about a plane of symmetry of the trashcan.

In another aspect of the invention, a method of manufacturing a trashcan includes the steps of: forming a container having a base and a peripheral wall extending upwardly from the base, the peripheral wall and the base defining an interior space of the container for receiving a trash bag, wherein an aperture is formed in the peripheral wall; forming a trash bag retention member arranged to grasp and retain a portion of a trash bag when inserted there through, the trash bag retention member including an arrangement of flexible, resilient fingers; and attaching the trash bag retention member to the container, wherein the trash bag retention member is received within the aperture and affixed to the container.

In features of this aspect, the trash bag retention member is attached to the container with a mechanical bond; the trash bag retention member is attached to the container with a chemical bond; and the trash bag retention member is thermo welded to the container.

In another feature of this aspect, the step of attaching the trash bag retention member to the container includes snapping the trash bag retention member into place within the aperture.

In a feature of this aspect, the container is formed with a plurality of apertures and a plurality of trash bag retention members are formed for attaching to the apertures.

In a feature of this aspect, the aperture is formed adjacent a rim of the container.

In a feature of this aspect, the step of forming the container comprises molding the container.

The molding may comprise injection molding, and the step of forming the trash bag retention member may comprise comolding a frame and a flexile, resilient panel to the frame. The frame preferably is formed from a first material and the panel is formed from a second, different material. The step of forming the container also may comprises injection molding the container, and the container may be formed from a third material different from the first and second materials or from the may be formed from the second material from which the frame is formed.

In accordance with another aspect of the invention, a method of manufacturing a trashcan includes the steps of: forming, in a first mold, a container having a base and a peripheral wall extending upwardly from the base, the peripheral wall and the base defining an interior space of the container for receiving a trash bag, wherein an aperture is formed in the peripheral wall; and after performance of the first step, placing the formed container in a second mold and forming a trash bag retention member in the aperture, the retention member being molded to the container and including an arrangement of flexible, resilient fingers arranged to grasp and retain a portion of a trash bag when inserted through the trash bag retention member into the interior space of the container.

In a feature of this aspect, the container is formed by injection molding.

In a feature of this aspect, the trash bag retention member is formed by injection molding.

In a feature of this aspect, the container and the trash bag retention member are formed by comolding.

In yet another feature of this aspect, the container is formed with a plurality of apertures and a plurality of trash bag retention members are formed therein.

In addition to the aforementioned aspects and features of the present invention, it should be noted that the present invention further includes the various possible combinations of such aspects and features.

V. BRIEF DESCRIPTION OF THE DRAWINGS

Further aspects, features, embodiments, and advantages of the present invention will become apparent from the following detailed description with reference to the drawings, wherein.

VI. DETAILED DESCRIPTION

Figure 1A:
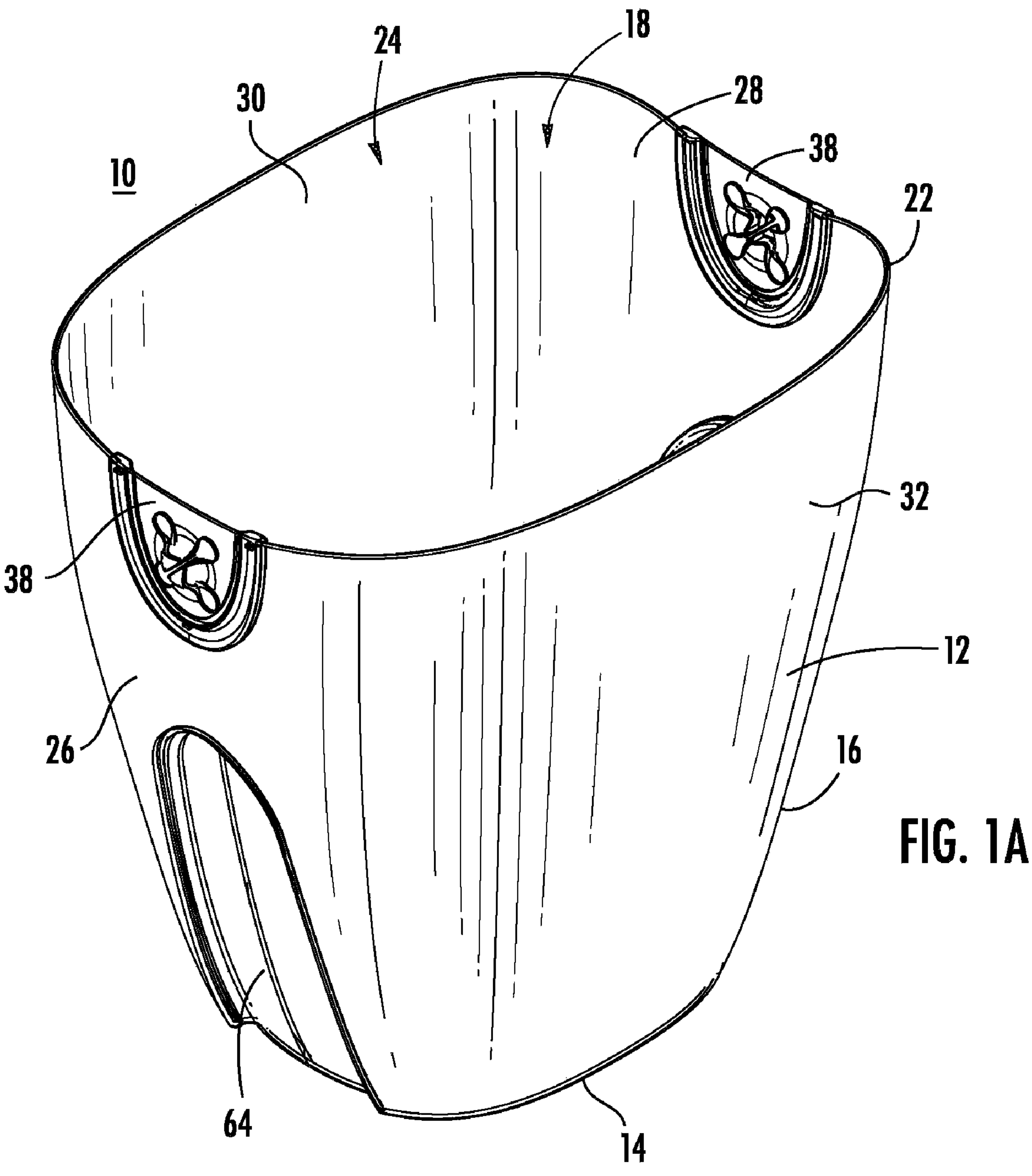
FIG. 1A is a perspective view of a trashcan assembly in accordance with a preferred embodiment of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term-differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of preferred embodiment(s) is merely exemplary in nature and is in no way intended to limit the invention, its application, or uses.

Figure 1B:
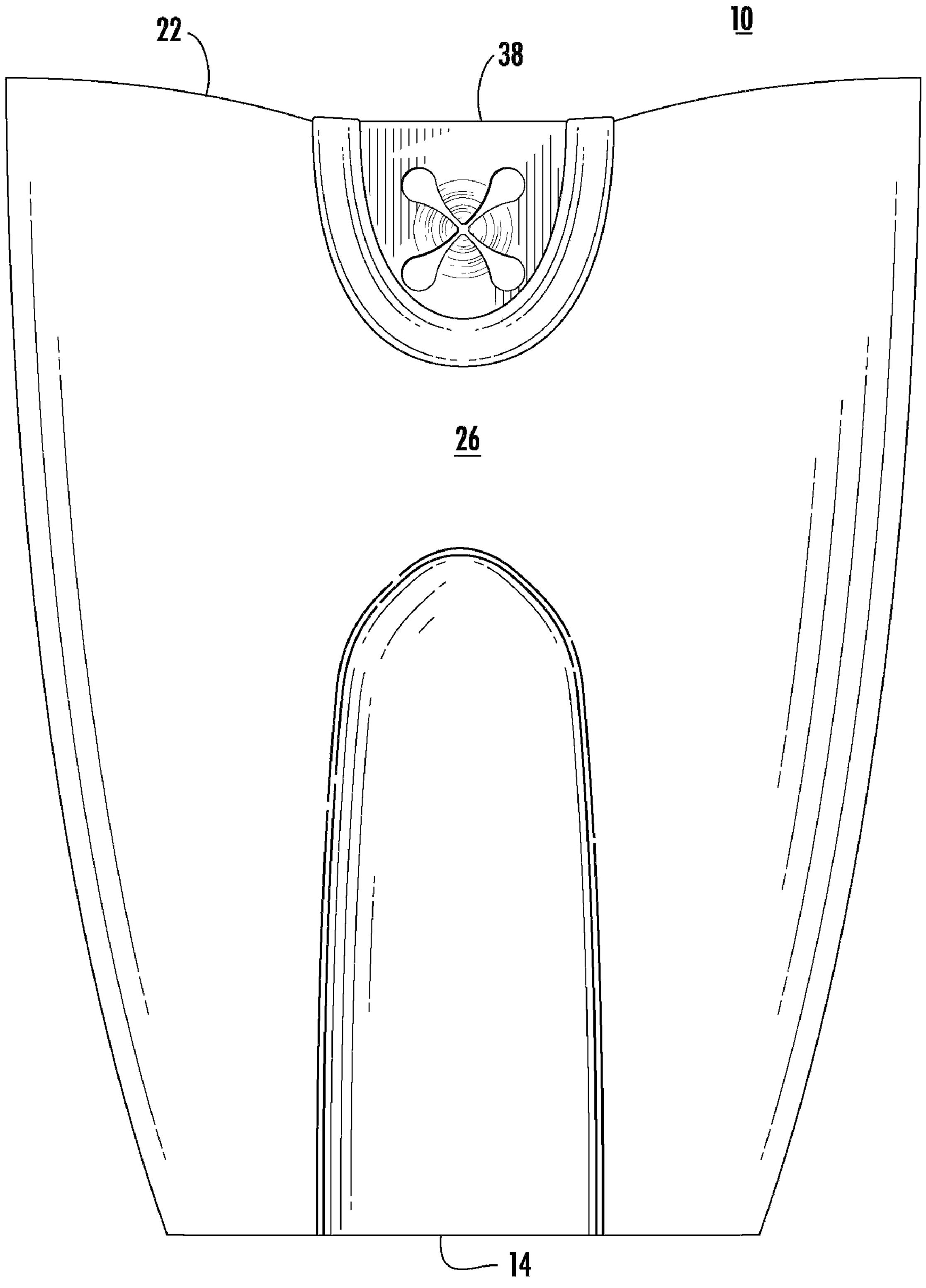
FIG. 1B is a side elevational view of the trashcan assembly of FIG. 1A1
Figure 1C:
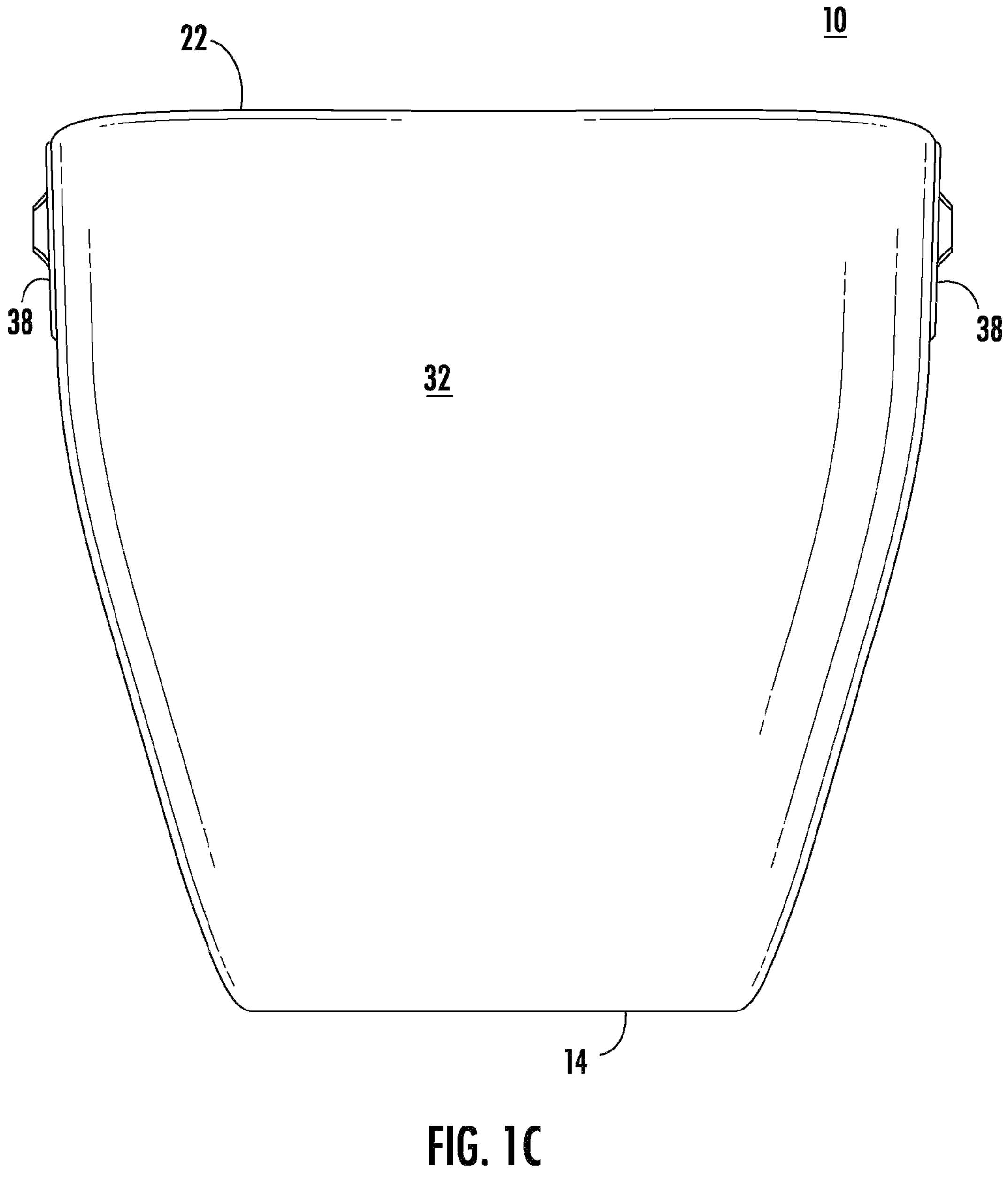
FIG. 1C is a front elevational view of the trashcan assembly of FIG. 1A.
Figure 1D:
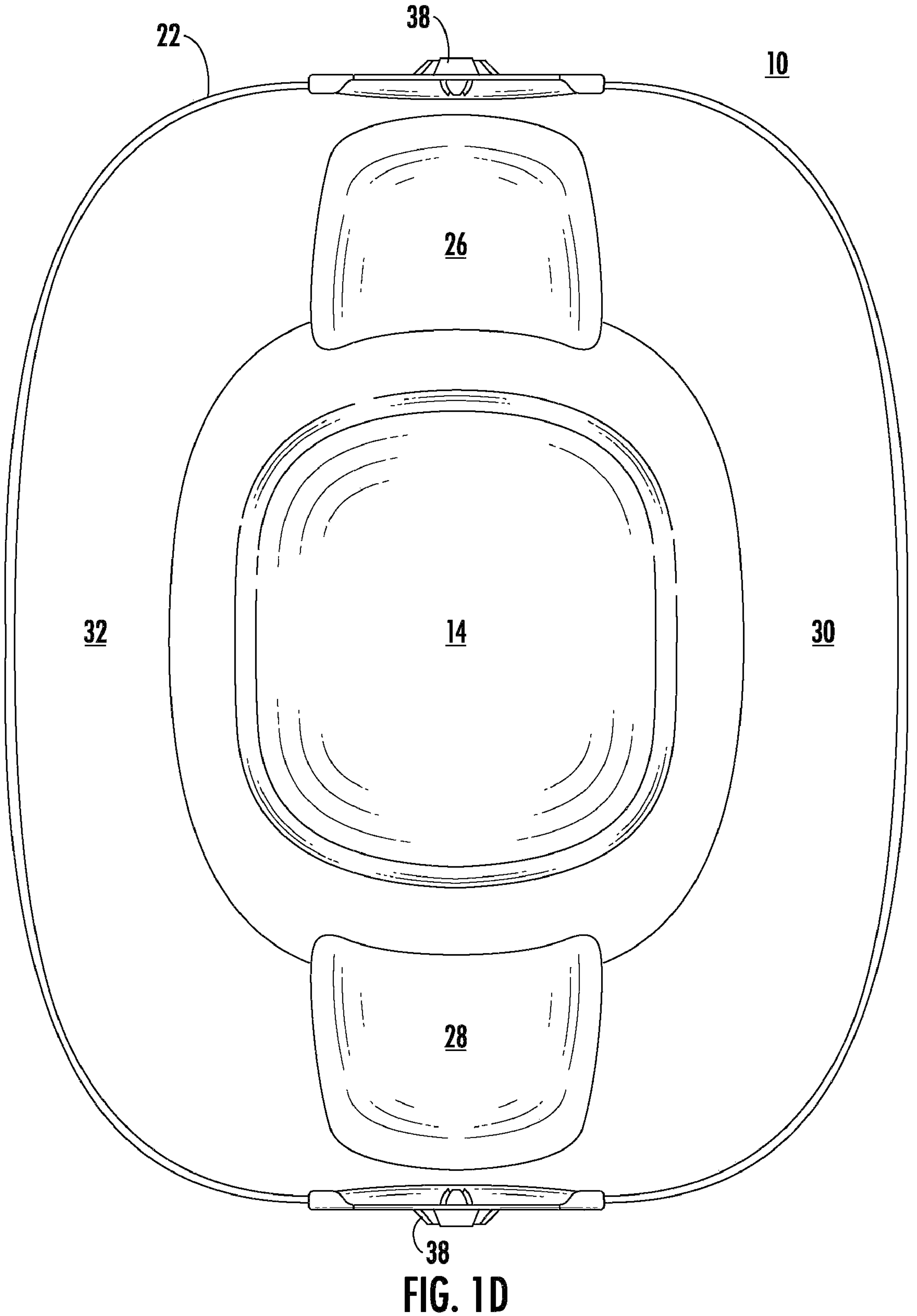
FIG. 1D is a top view of the trashcan assembly of FIG. 1A.
Figure 1E:
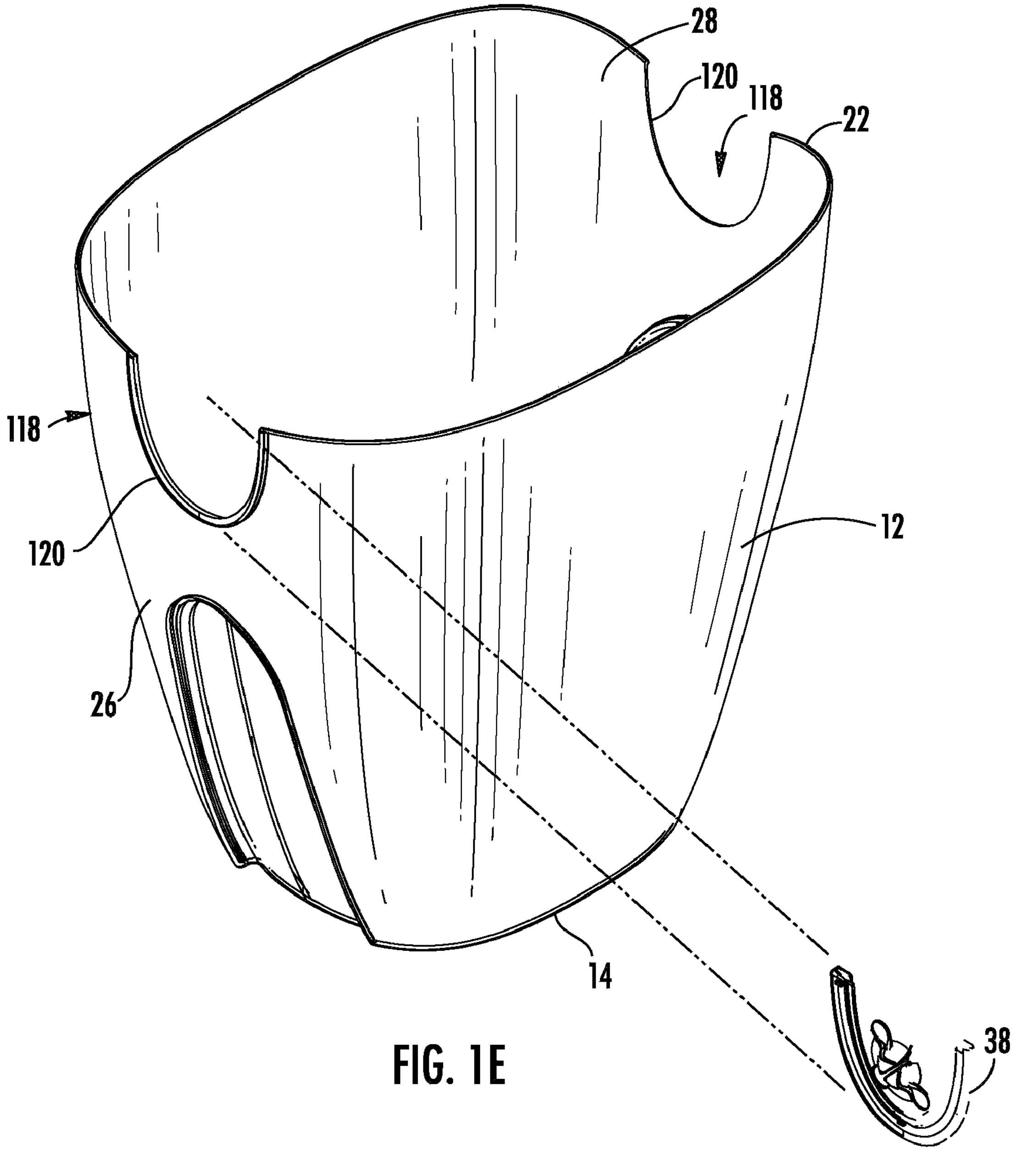
FIG. 1E is a perspective view showing a step in a method of manufacturing the trashcan assembly of FIG. 1A.

FIGS. 1A-1D illustrate a trashcan assembly 10 in accordance with a preferred embodiment of the present invention. Specifically, FIG. 1A is a perspective view of a trashcan assembly 10 in accordance with a preferred embodiment of the present invention; FIG. 1B is a side elevational view of the trashcan assembly 10 of FIG. 1A; FIG. 1C is a front elevational view of the trashcan assembly 10 of FIG. 1A; FIG. 1D is a top view of the trashcan assembly 10 of FIG. 1A; and FIG. 1E is a perspective view showing a step in a method of manufacturing the trashcan assembly 10 of FIG. 1A. Additionally, FIG. 2 illustrates the placement of a trash bag 20 into the trashcan assembly 10 of FIG. 1.

Figure 3A:
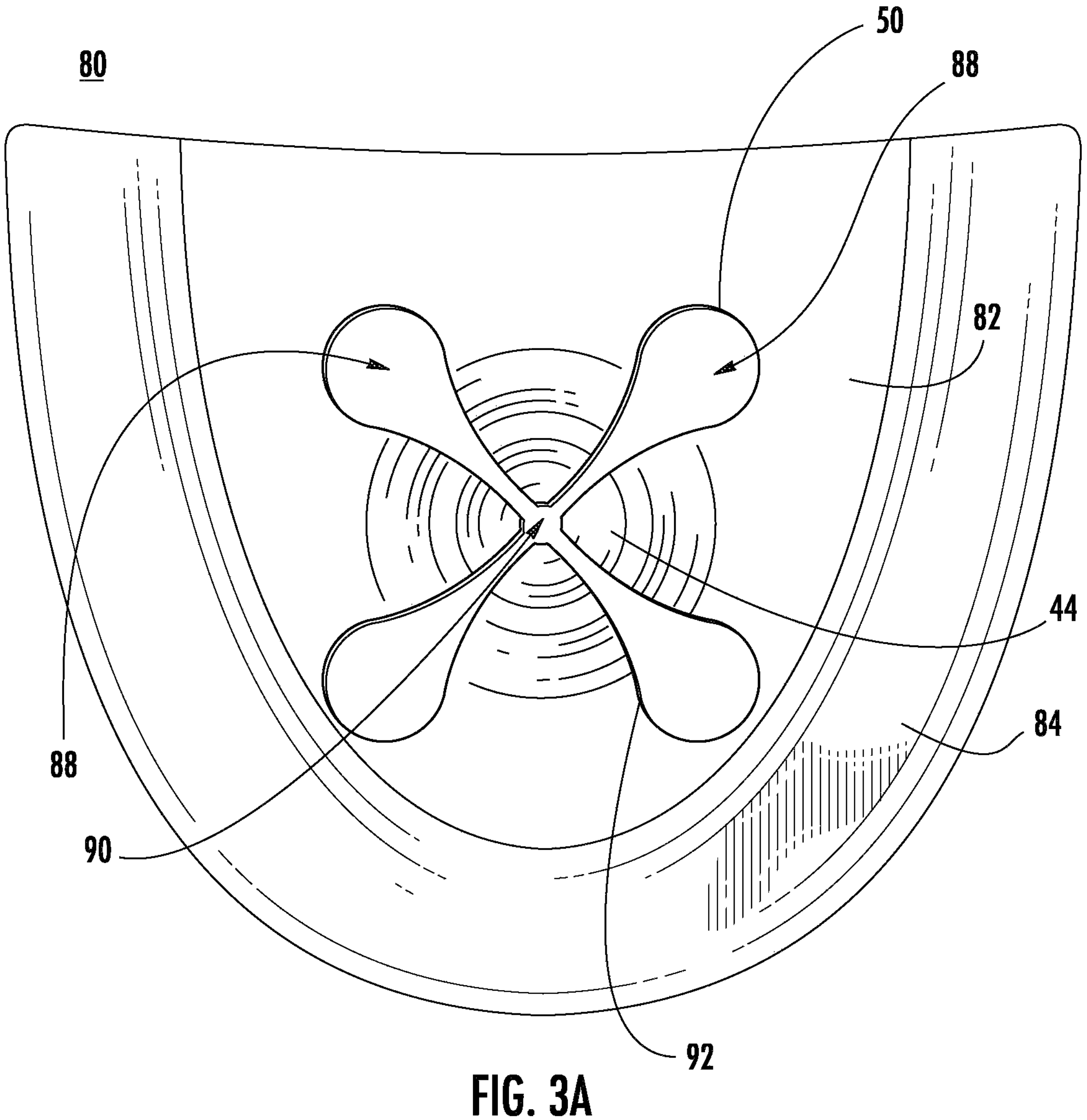
FIG. 3A is a front elevational view of a panel insert of the trashcan assembly of FIG. 1A.
Figure 3B:
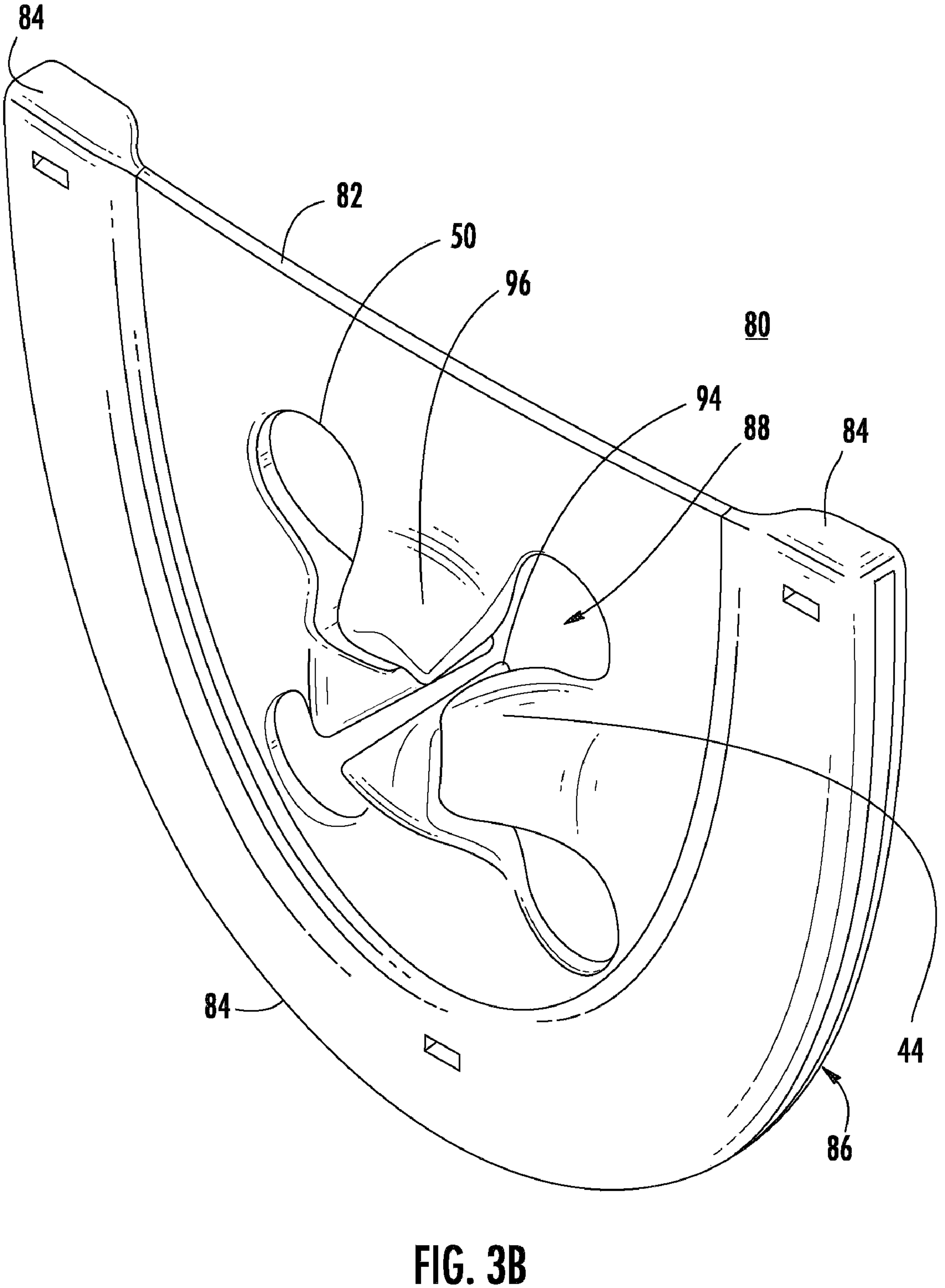
FIG. 3B is a perspective view of the panel insert of the trashcan assembly of FIG. 1A.
Figure 3C:
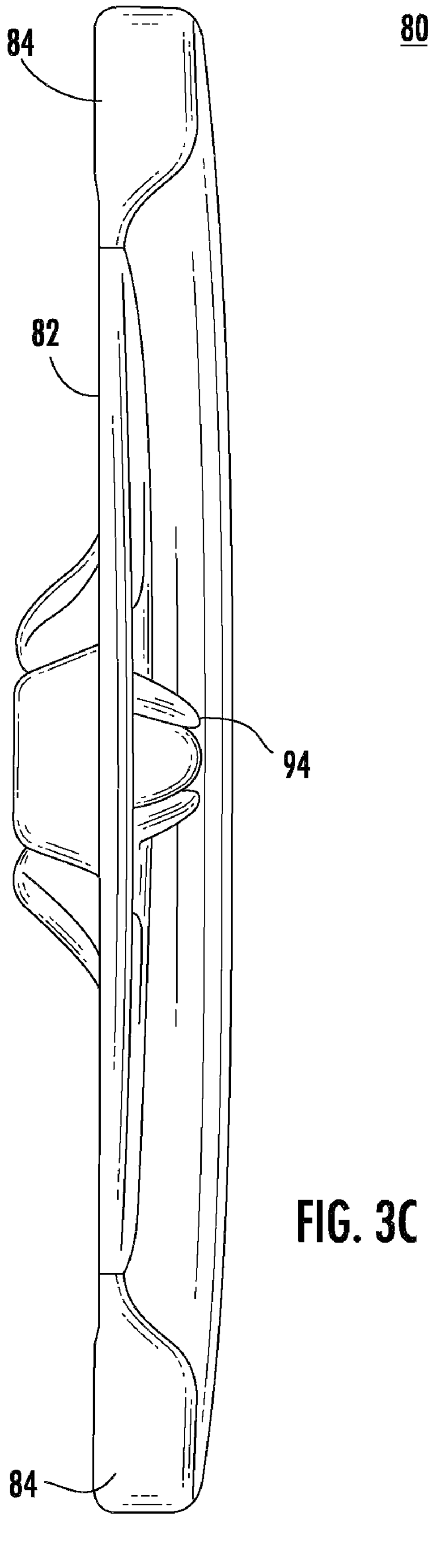
FIG. 3C is a top view of the panel insert of the trashcan assembly of FIG. 1A.
Figure 3D:
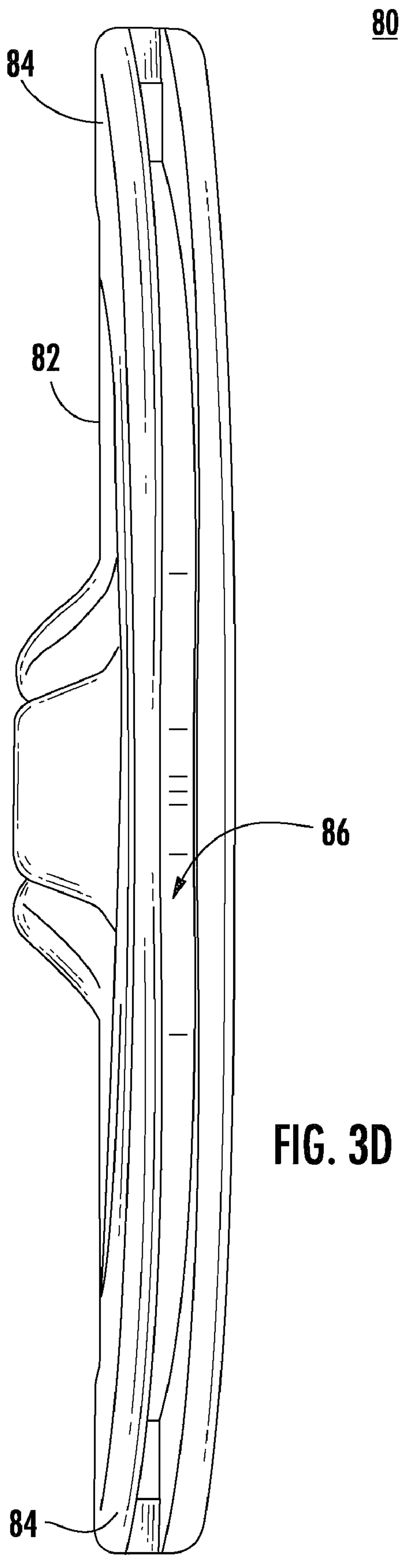
FIG. 3D is bottom view of the panel insert of the trashcan assembly of FIG. 1A.
Figure 3E:
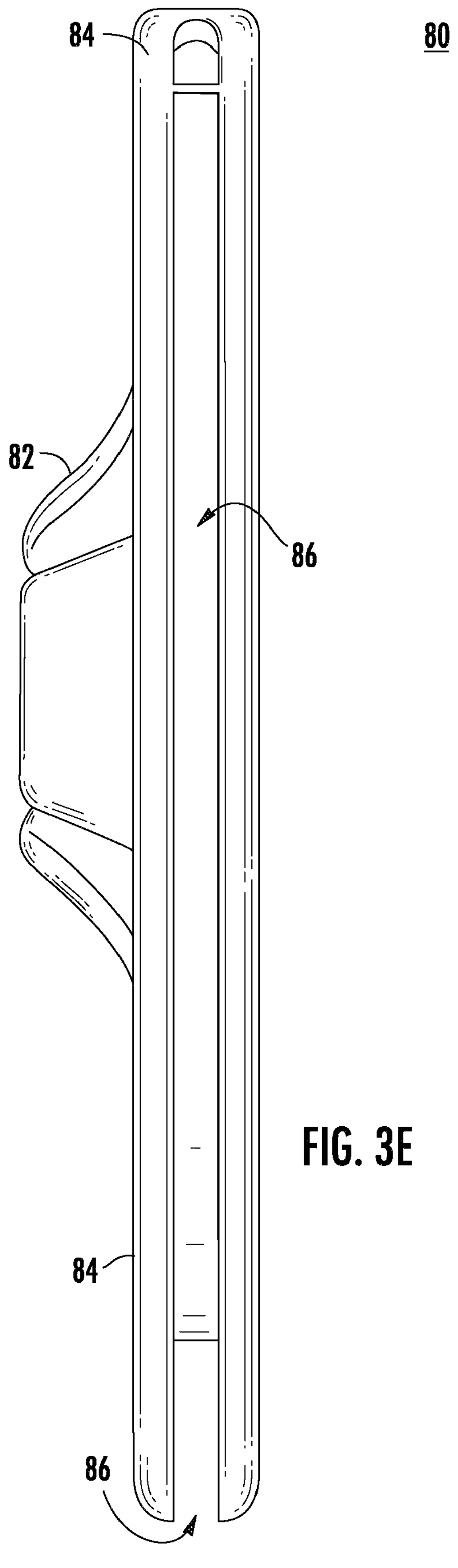
FIG. 3E is a side elevational view of the panel insert of the trashcan assembly of FIG. 1A.

In connection with the trashcan assembly 10 of FIG. 1, FIGS. 3A-3E further serve to illustrate the novel panel insert 80 of the trashcan assembly 10 of FIG. 1 in accordance with an aspect of the present invention. Specifically, FIG. 3A is a front elevational view of the panel insert 80 of the trashcan assembly 10 of FIG. 1A; FIG. 3B is a perspective view of the panel insert 80 of the trashcan assembly 10 of FIG. 1A; FIG. 3C is a top view of the panel insert 80 of the trashcan assembly 10 of FIG. 1A; FIG. 3D is bottom view of the panel insert 80 of the trashcan assembly 10 of FIG. 1A; and FIG. 3E is a side elevational view of the panel insert 80 of the trashcan assembly 10 of FIG. 1A.

Figure 2:
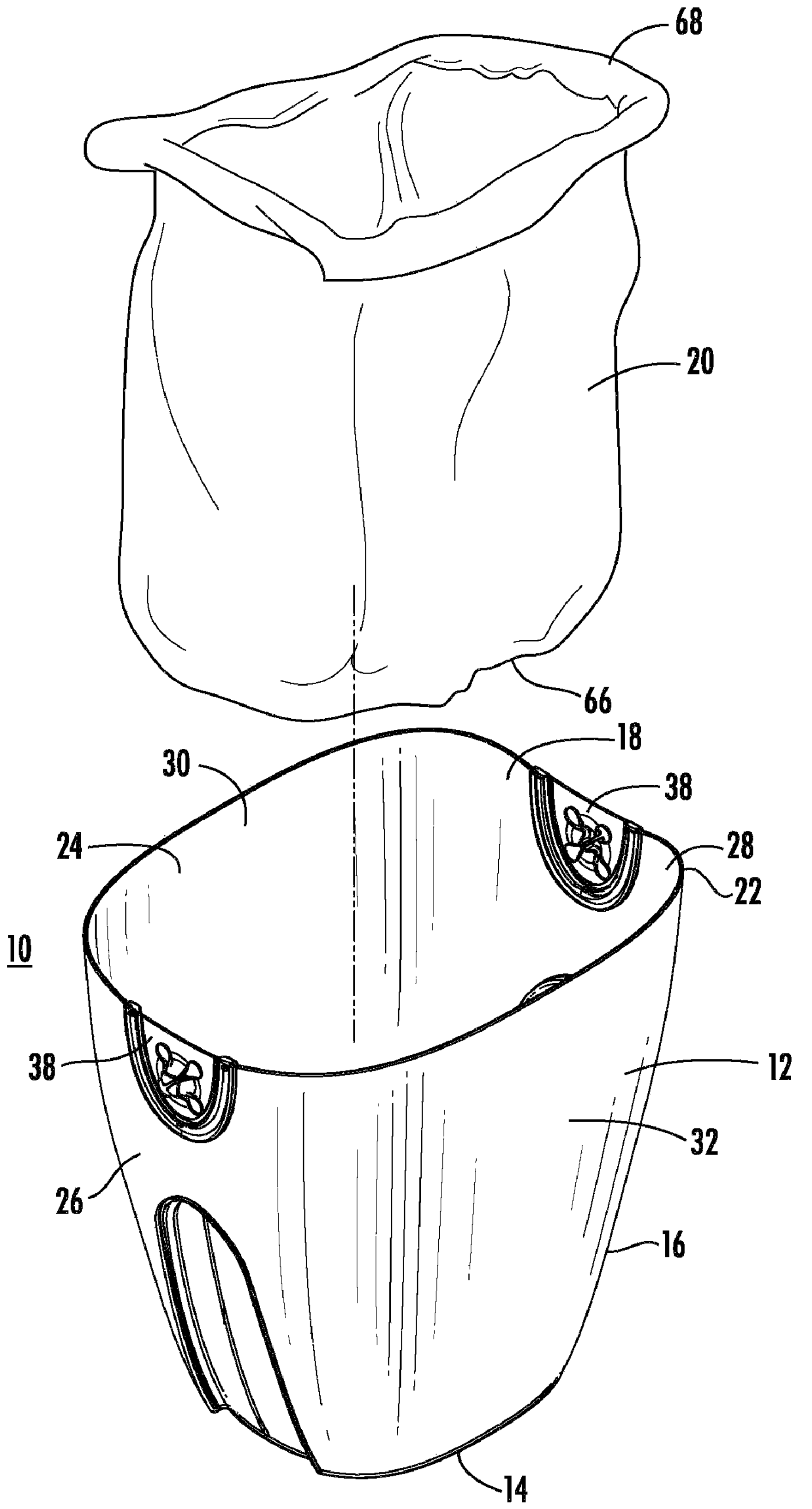
FIG. 2 is a perspective view illustrating placement of a trash bag in the trashcan assembly of FIG. 1.

Generally, the trashcan assembly 10 includes a container 12 having a base 14 and a peripheral wall 16 extending upwardly from said base 14 to define an enclosed, interior space 18 for receipt of a trash bag 20 therein, as illustrated in FIG. 2. In this respect, the peripheral wall 16 comprises a first sidewall 26, a second sidewall 28, a third sidewall 30 and a fourth sidewall 32, with the first and second sidewalls 26,28 being located opposite one another and the third and fourth sidewalls 30,32 being located opposite one another. The first and second sidewalls 26,28 are relatively shorter in peripheral extent than that of the third and fourth sidewalls 30,32 whereby the container 12 has a generally non-square, rectangular shape. Additionally, the connection between the first sidewall 26, second sidewall 28, third sidewall 30 and fourth sidewall 32 are rounded such that, although generally rectangular in shape, the container 12 includes rounded corners rather than sharp corners. The peripheral wall 16 at least partially defines a rim 22 of the container 12 that bounds and defines a mouth 24 of the trashcan assembly 10. Further, it is preferred that a relatively thin strip of the material that comprises the trash bag retention member 38 (described below) cover the rim 22 of the container 12 that is defined by the peripheral wall 16. The peripheral wall 16 also tapers in its extent from the rim 22 to the base 14 such that the container 12 decreases in cross-sectional area from the rim 22 to the base 14.

The peripheral wall 16 further preferably defines recessed areas 64 that are formed in the first and second sidewalls 26,28 of the container 12 adjacent the base 14 thereof. The recessed areas 64 start at the base 14 of the container 12 and extend slightly over half the height of the peripheral wall 16. These recessed areas 64 are configured to receive therein the same recessed areas of another container 12 when nested therein to provide a stable nesting arrangement. Nesting capability of trashcans is advantageous for storage and for display, especially by retailers.

Preferably, the base 14 and the peripheral wall 16 are integrally formed from a plastic material that provides a rigidness to the overall structure of the container 12 such that the container 12 has sufficient structural integrity to be freestanding, even when the interior space 18 has been filled with trash. Examples of such material include, but are not limited to, various polypropylene and polyethylene materials. It is preferred that the container 12 be formed from a polypropylene material. It is also preferred that the container 12 be formed from one or more molding processes, such as injection molding processes.

In addition to the base 14 and peripheral wall 16, the trashcan assembly 10 further includes two opposing bag retention members 38, with one of the bag retention members 38 being disposed in sidewall 26 and the other bag retention member being disposed in sidewall 28. As discussed in greater detail below, the bag retention members 38 retain a trash bag tautly to the rim 16 of the container 12 and, further, serve to keep the trash bag from slumping into the container, even when trash is thrown through the mouth 24 of the container 12 into the trash bag.

Each trash bag retention member 38 preferably is disposed in the first and second sidewalls 26,28 of the container 12 such that the bag retention member 38 actually forms part of the rim 22 of the container 12. The bag retention member 38 may not be disposed so as to define part of the rim 22 but, rather, may be disposed at a small distance from the rim 22; however, such design, while within the scope of one or more aspects of the contemplated invention, is not preferred.

The bag retention members 38 of the trashcan assembly 10 are in the form of panel inserts 80. Preferably, the panel inserts 80 forming the bag retention members 38 are identical in construction, and various views of an exemplary panel insert 80 are shown in FIGS. 3A-3E. With reference to these figures, the panel insert 80 includes a flexible, resilient panel 82 partially bounded by a generally U-shaped frame 84. The frame 84 includes a channel 86 for attachment to the container 12, as described in further detail below. The panel 82 preferably is integrally formed with the frame 84 in a comolding process. Examples of materials from which the panel 82 may be formed include, but are not limited to, styrenic thermoplastic elastomers, and it is preferred that the panel 82 be formed from GLS G7960 Styrenic TPE.

The panel 82 defines four resilient, flexible fingers 44 and four vents 50 that are symmetrically oriented within a square area (not shown). The vents 50 allow air to escape that is trapped between a trash bag and the interior surface of the trashcan container. Each vent 50 is located between and at the base of the fingers 44 and includes a pear-shaped opening 88 that transitions to inwardly sloping sides terminating at a center opening 90, which opening is located between and defined by terminal ends 94 of all four of the fingers 44. Each of the fingers 44 also has two side edges 92 in addition to the terminal 94 ends 94. In general, each of the fingers 44 is somewhat triangular in shape and extends from a base 96 (deemed to lie along a side of the square) to the terminal end 94 thereof. In so extending inwardly toward the central opening 90, the side edges 92 of the fingers 44 form the sloping sides of the vents 50.

FIG. 1E is a perspective view showing a step in a method of manufacturing the trashcan assembly 10 of FIG. 1A. In this regard, the container 12 has already been manufactured in an injection molding step. Similarly, bag retention member 38 has already been formed through an injection molding process.

As will be apparent from FIG. 1E, the first and second sidewalls 26,28 of the container 12 each includes an aperture 118. Each aperture 118 is centrally located along the respective sidewall 26,28, and each aperture 118 extends from the rim 22 toward the base 14 approximately two to three inches, and the radius of curvature of the rounded bottom of each aperture 118 is approximately one to two inches. The apertures 118 are mirror images of one another, and each is configured to receive a bag retention member 38. In this respect, a perimeter 120 of each aperture 118 is U-shaped and includes a flange projecting therefrom. The flange extending along the perimeter 120 of the aperture 118 is configured to be received within the U-shaped channel 86 of a bag retention member 38 as represented in FIG. 1E in a snap-fit manner. The bag retention member 38 further may be affixed within the aperture 118 using any of a number of adhesion techniques. Examples include, but are not limited to, chemical bonding, thermowelding, and mechanical bonding. Due to the similarity in construction of the apertures 118 and the similarity in construction of the bag retention members 38, any one of the bag retention members 38 may be received in any one of the apertures 118.

Additionally, it will be appreciated by the Ordinary Artisan that the bag retention members 38 may be utilized with a different trashcan container so long as an aperture in such container is configured to receive a bag retention member 38 in the same manner as aperture 118. This interchangeability of containers makes the manufacture of differently sized trashcans including bag retention members relatively inexpensive when compared to the alternative of integrally forming panels with the different containers in injection molding processes (which is an alternative manufacturing method of the present invention described in further detail below).

In use, the trashcan assembly 10 receives a trash bag 20 as shown in FIG. 2. The trash bag 20 includes a bottom 66 and a top 68, and the bottom 66 of the trash bag 20 is disposed adjacent the base 14 of the container 12 of the trashcan assembly 10 when fully inserted into the container 12. Typically when placed in this position, the top 68 of the trash bag 20 may be folded over the rim 22 of the container 12 for retaining the trash bag in a trash-receiving open position. Additionally, in accordance with the present invention, a portion 40 of the top 68 of the trash bag 20 is inserted into one or both of the bag retention members 38 in order to further prevent the trash bag 20 from falling or slumping into the container 12, especially when a trash item is tossed into the container 12 or a heavy piece of trash is placed into the container 12. The bag retention members 38 further serve to keep the trash bag taut about the rim 22 of the container by retaining therein any excess portion of the bag.

The specific manner in which the bag retention members 38 retain the portion of the trash bag is described in further detail with regard to FIGS. 8-11. First, however, alternative embodiments of the bag retention member 38 in accordance with certain aspects of the present invention are described with reference to FIGS. 4-7.

Figure 4:
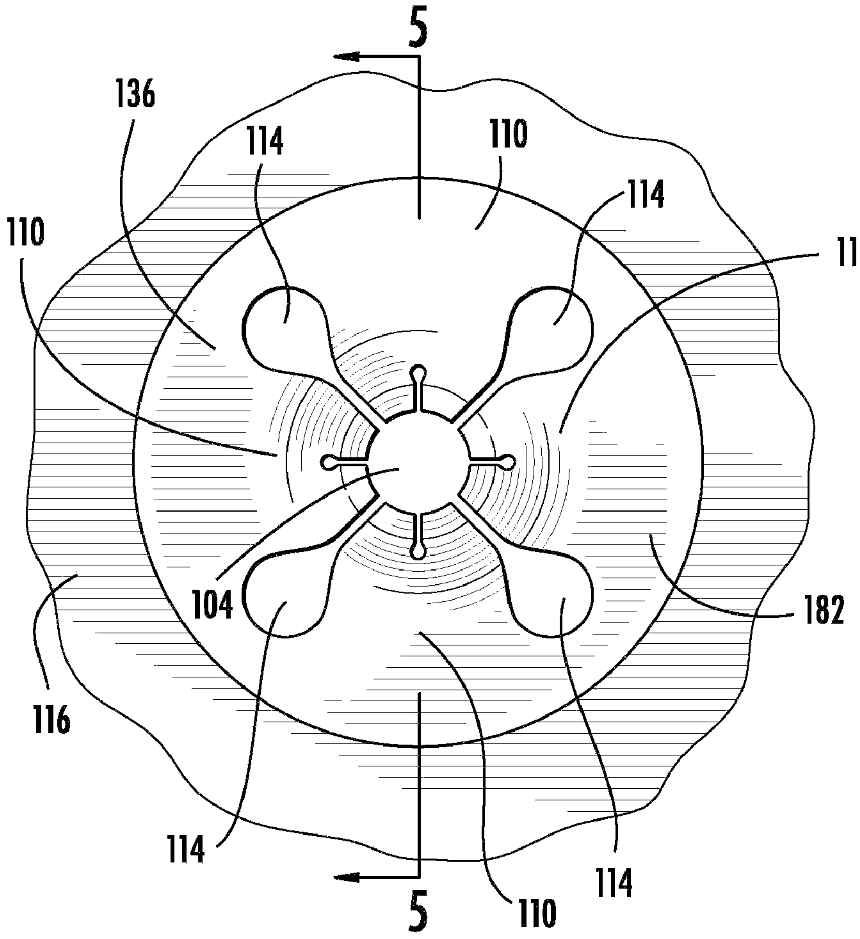
FIG. 4 is an elevational side view of a bag retention member located in a peripheral wall of a trashcan container in accordance with another preferred embodiment of the present invention, which peripheral wall is only partially shown.
Figure 5:
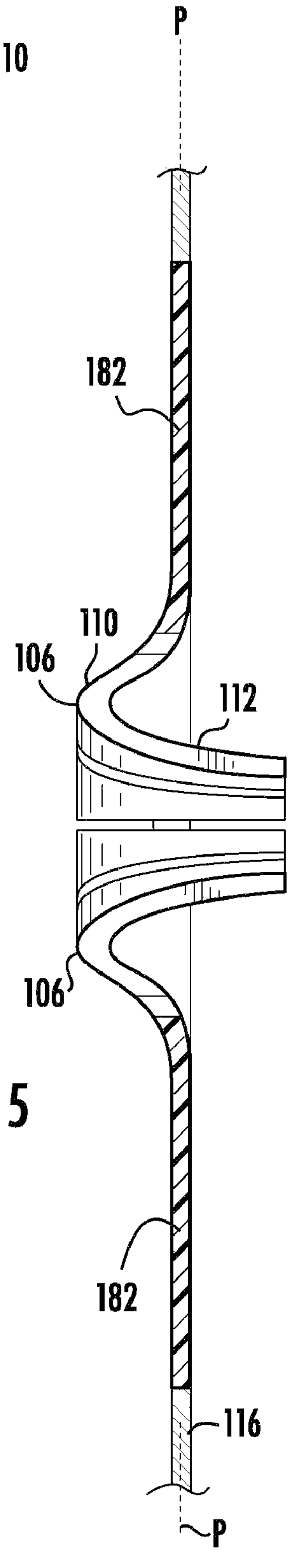
FIG. 5 is a cross-sectional view of the bag retention member of FIG. 4 taken along the line 5-5.

In this respect, FIGS. 4-5 illustrate a first alternative bag retention member 136 in accordance with an aspect of the present invention. FIG. 4 is an elevational side view of the bag retention member 136 located in a peripheral wall 116 of a trashcan container, which peripheral wall 116 is only partially shown. FIG. 5 is a cross-sectional view of the bag retention member 136 taken along the line 5-5 of FIG. 4. In contrast to the bag retention member 38 of the trashcan assembly 10 of FIG. 1, the bag retention member 136 comprises just a flexible, resilient panel 182 that is integrally formed in an injection molding process with the peripheral wall 116 of the trash container. Accordingly, no frame exists in the bag retention member 136 as compared to the frame 84 of the bag retention member 38. It will also be noted that the retention member 136 is disposed on the peripheral wall 116 at a distance below a rim of the container. Additionally, it is noted that the peripheral wall 116 is shown to completely surround the retention member 136 and, therefore, the panel of the retention member does not define a portion of the rim of the container.

The panel 182 is formed so as to define four fingers 110 disposed about a central, circular opening 104. Each of the fingers 110 curves to define a raised lip 106 that, collectively, encircle the opening 104 and define a first end of a funnel-shaped conduit. Each of the lips 106 (and thus the first end of the funnel shaped conduit) extends to one side of a plane P that is located in an area of the peripheral wall 16 in which the panel 182 is disposed. Each of the fingers 120 furthermore defines an annular portion 112 of the other end of the funnel-shaped conduit, with the annular portions 112 (and thus the other end of the funnel shaped conduit) extending on the other side of the plane within the interior, closed space of the trashcan container. The opening 104 of the funnel-shaped conduit preferably is sized to roughly correspond to the average diameter of the tip of a finger so as not to pinch a finger when a portion of a trash bag is pushed through the funnel-shaped conduit.

The panel 182 also preferably defines four vents 114, each of which comprises a pear shaped opening symmetrically disposed about the central opening 104. Each vent 114 opens into the interior, closed space of the trashcan container and is provided for the release of air that otherwise may become trapped between the trash bag and inner surface of the container. Moreover, it is believed that after a portion of the trash bag has been inserted through the central opening 104, insufficient space remains for adequate venting of the interior of the trashcan container and that the provision of the vents 114, which are not plugged by any portion of the trash bag, serve to provide adequate venting of the interior of the trashcan container.

Additionally, in order to provide increased localized flexibility of the fingers 110 in the region immediately adjacent the opening 104, a small slit is formed in each finger 110.

In use, a portion of a top of a trash bag may be inserted through the central opening 104 of the trash retaining component 102 to retain the trash bag to the rim of the trashcan and to prevent the trash bag from falling or slumping into the container. The lip 106 of the central opening 104 grasps the portion of the trash bag and keeps the bag from falling into the assembly. The vent openings 114 allow air trapped between the trash bag and the container to escape, thus allowing the trash bag to lie relatively flat against the peripheral wall.

In use, a user places a trash bag in the interior of the container with a bottom of the trash bag being disposed near the base of the container and a top of the trash bag folding over the rim of the container. A portion of the top of the trash bag then may be pressed through the central opening 104 of the panel 182 to prevent the trash bag from falling into the container when a heavy item is placed in the trash bag. Specifically, a user may press the portion of the bag through the central opening 104 with his finger. When the user removes his finger from the central opening 104, the portion of the bag is frictionally grasped by the funnel-shaped conduit, including portions 112, 106 thereof serve to retain the portion of the bag in place and prevent the bag from falling into the container.

In addition to not including a frame, the panel 182 of the bag retention member 136 will be seen to define a different opening configuration compared to that of the panel 82 of the bag retention member 38. The opening configuration of the bag retention member 38 will be described in detail with reference to FIGS. 6-11.

Figure 6:
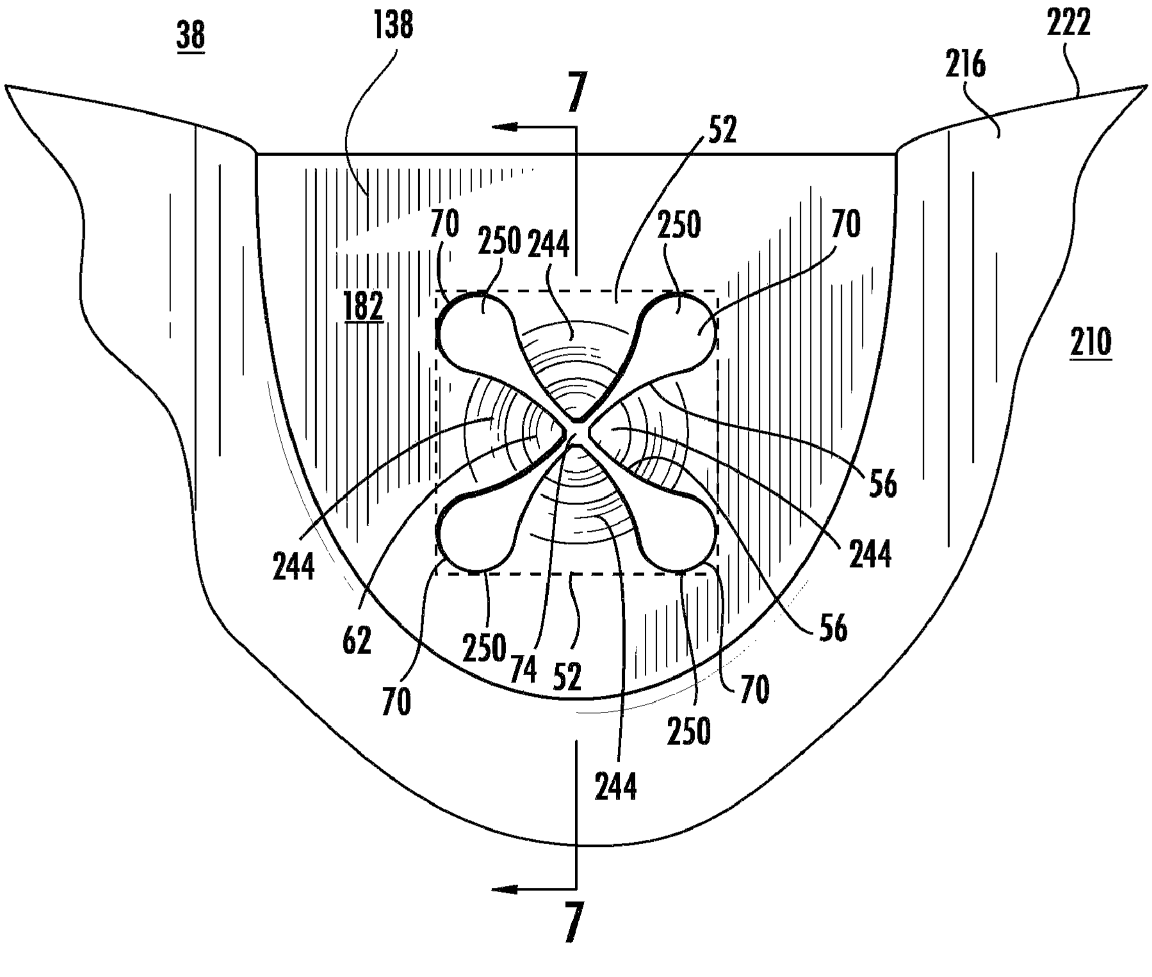
FIG. 6 illustrates an elevational side view of a trashcan assembly including a bag retention member in a peripheral wall of a trashcan container in accordance with another preferred embodiment of the present invention, which peripheral wall is only partially shown.
Figure 7:
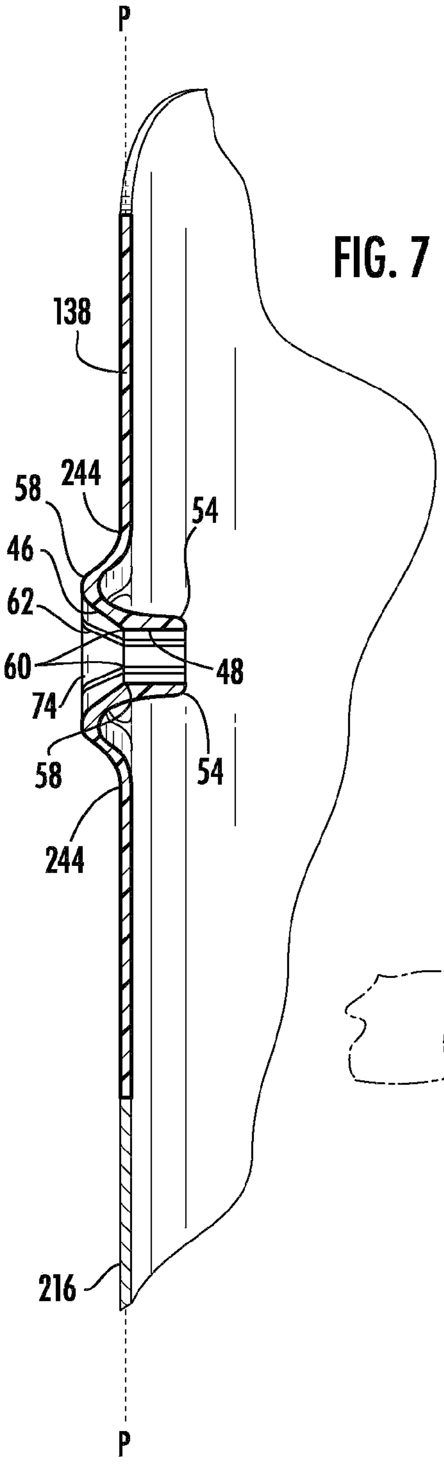
FIG. 7 illustrates a cross-sectional view of the bag retention member of FIG. 6 taken along the line 7-7.
Figure 8:
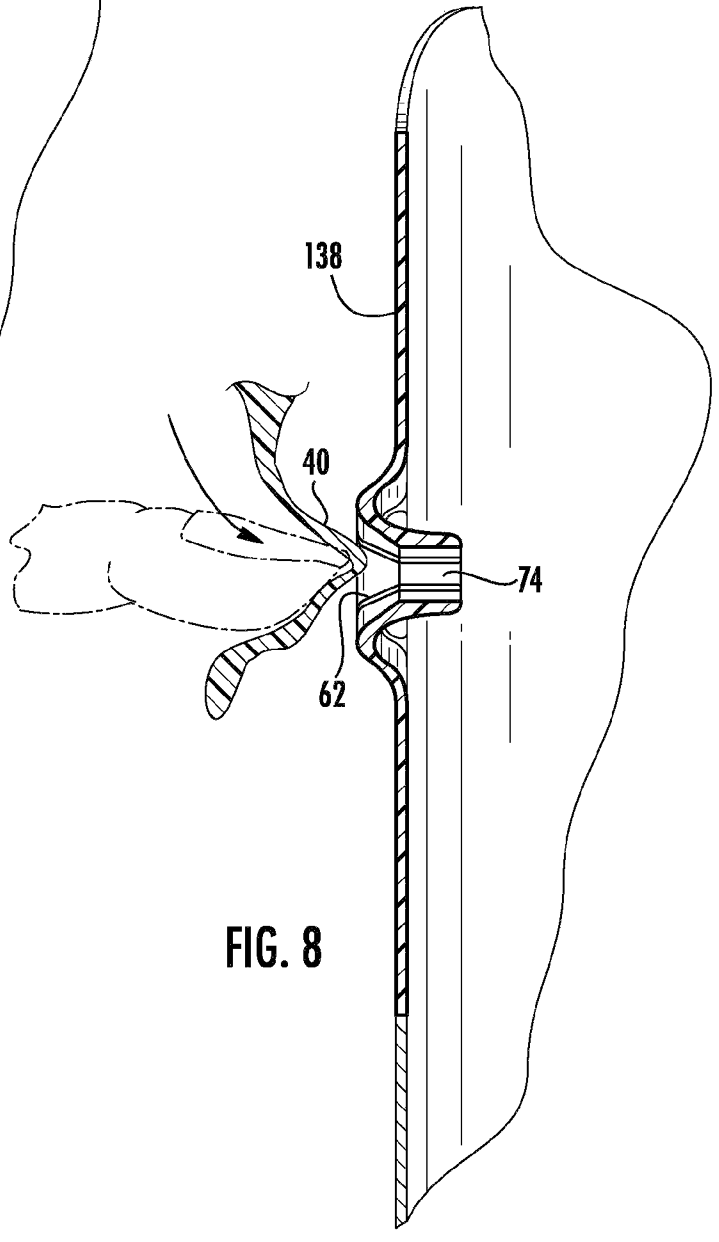
FIGS. 8-11 are cross-sectional views similar to that of FIG. 7 collectively illustrating the insertion and retention of a portion of a trash bag.
Figure 9:
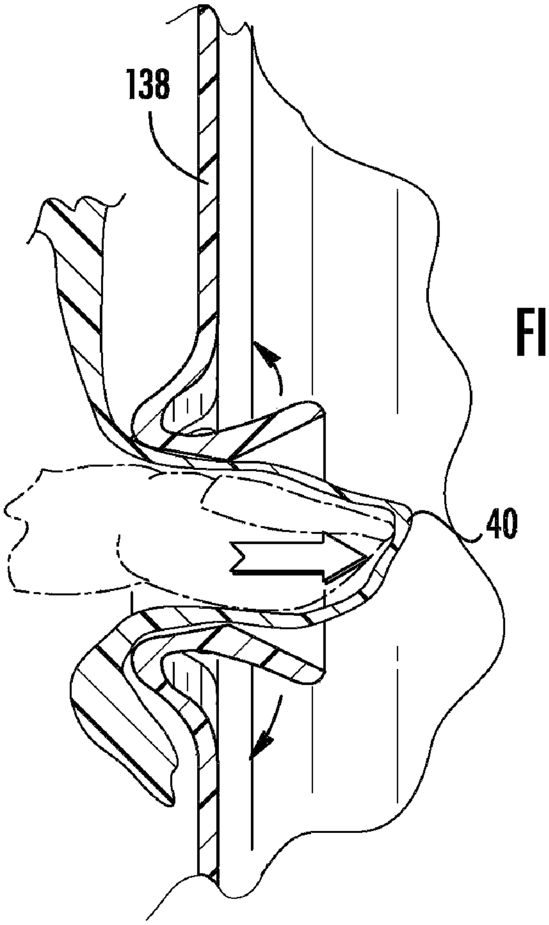
Figure 10:
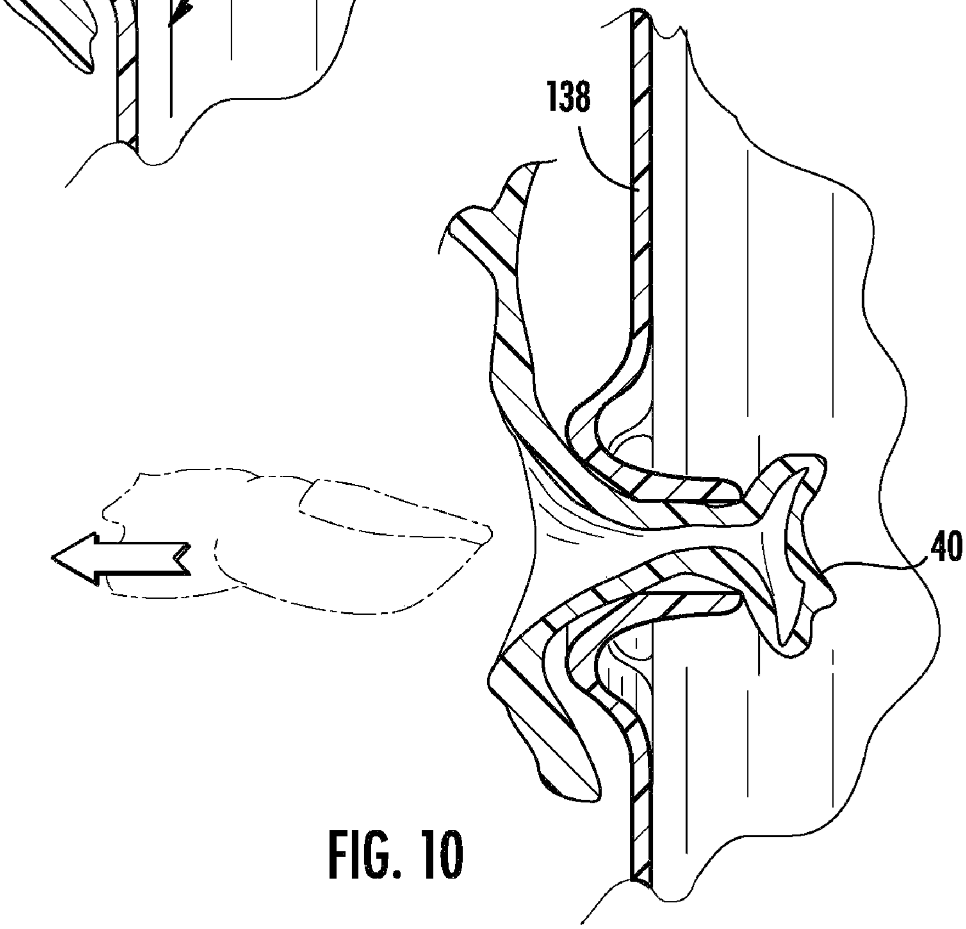

In this respect, FIGS. 6-7 illustrate a bag retention member 138 in accordance with a second alternative embodiment of the present invention. Specifically, FIG. 6 illustrates an elevational side view of a trashcan assembly 210 (which is only partially shown) including the bag retention member 138, and FIG. 7 illustrates a cross-sectional view taken along the line 7-7 of FIG. 6. In accordance with an aspect of the invention, the bag retention member 138 represents a combination of the features of the bag retention members 38, 106. In particular, the bag retention member 138 includes the same opening configuration as that of bag retention member 38, but is constructed in similar manner to the bag retention member 136 in that bag retention member 138 includes a panel 182 that is integrally formed with a peripheral wall 216 of the trashcan container. Further as illustrated in FIG. 6, an upper edge portion of the panel 182 forms the rim 222 of the container in conjunction with the peripheral wall 216.

The panel 182 additionally defines four resilient, flexible fingers 244 and four vents 250 that are symmetrically oriented within a square area (the boundary of which square area is shown in phantom). The vents 250 allow air to escape that is trapped between a trash bag and the interior surface of the trashcan container. Each vent 250 is located between and at the base of the fingers 244 and includes a pear-shaped opening 70 that transitions to inwardly sloping sides terminating at a center opening 74, which opening is located between and defined by terminal ends 54 of all four of the fingers 244. Each of the fingers 244 also has two side edges 56 in addition to the terminal ends 54. In general, each of the fingers 244 is somewhat triangular in shape and extends from a base 52 (deemed to lie along a side of the square) to the terminal end 54 thereof. In so extending inwardly toward the central opening 74, the side edges 56 of the fingers 244 form the sloping sides of the vents 250.

In profile, as shown in FIG. 7, for example, each of the fingers 244 includes a first curve 58 and a second curve 60, with the first curve 58 being relatively closer to the base 52 and the second curve 60 being relatively closer to the terminal end 54. A first portion 46 of each finger 244 is defined between the base 52 and the second curve 60 thereof, and a second portion 48 is defined between the second curve 60 and the end 54. In extending inwardly from the base 52, the finger 244 first curves outwardly relative to a plane P of an area of the peripheral wall 216 in which the bag retention member 138 is disposed. The finger 244 continues to extend outwardly away from the plane P until the first curve 58, at which the finger 244 reverses directly and extends toward the plane P. At the point of inflection along the first curve 58, the finger 244 is disposed outside of the plane P of the peripheral wall 216. The finger 244 then curves inwardly relative to the plane P of the peripheral wall 216 to the second curve 60, which generally lies at the plane P of the peripheral wall 216. The finger 244 then extends along a generally linear line from the second curve 60 to the terminal end 54 of the finger 244. The terminal end 54 is disposed within the interior, enclosed space of the trashcan container on the opposite side of the plane P of the peripheral wall 216.

The side edges 56 of the fingers 244 preferably are disposed in very close disposition relative to one another along their inward extension from the first curves 58 to the terminal ends 54. This arrangement of the fingers 244 serves to form a generally rounded indentation 62 that is intended to conform to and accept the tip of the average finger, with the central opening 74 being disposed in the center of the rounded indentation 62. Thus, unlike the opening configuration of the bag retention member 136 of FIGS. 4-5, which is intended to generally permit the passage of an average finger therethrough, the opening configuration of the bag retention member 138 is intended to engage the tip of the average finger such that the tip of the finger directly displaces the finger 244 upon insertion of the finger through the bag retention member 138.

Figure 12:
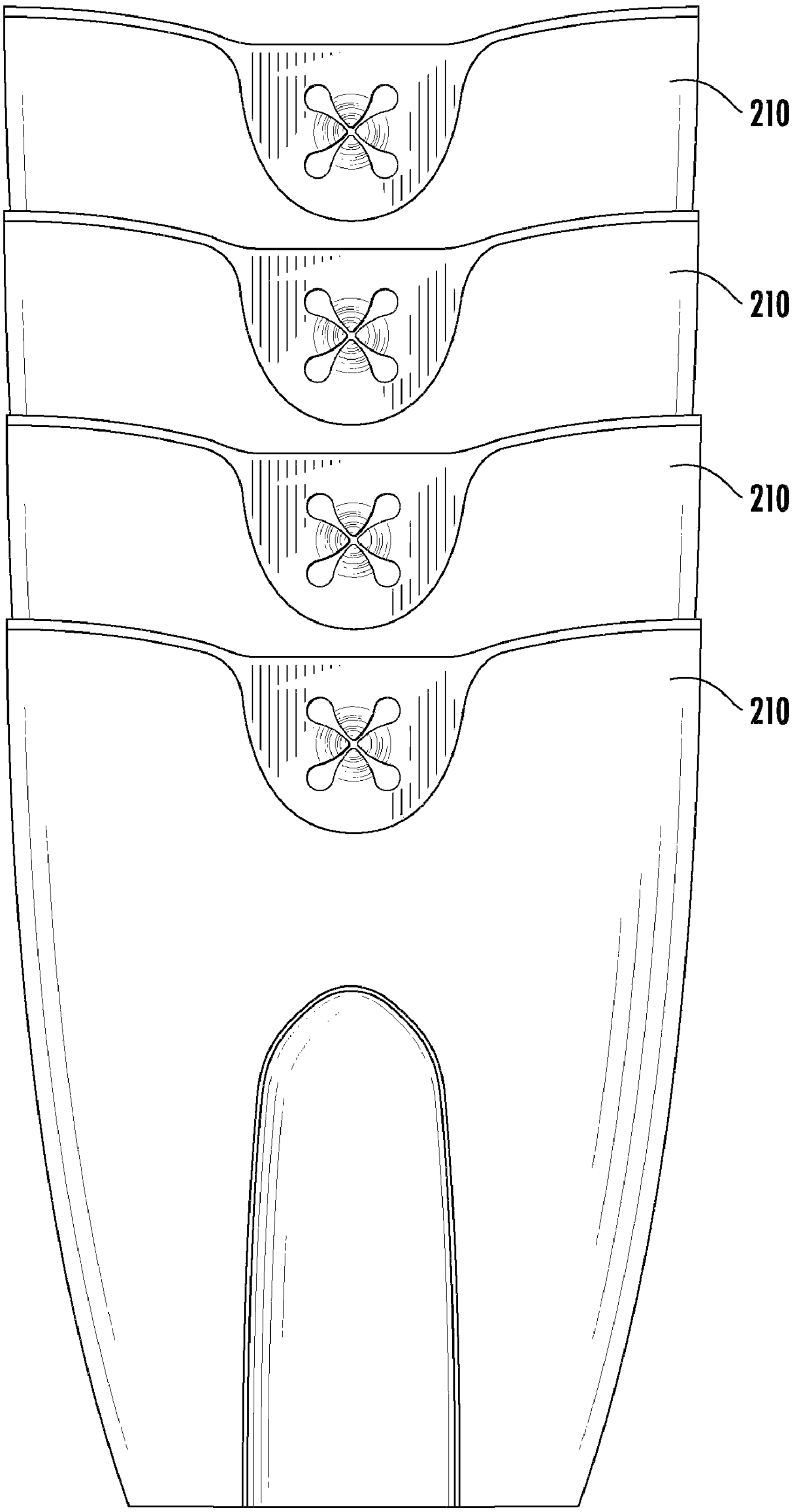
FIG. 12 is an elevational view of a nested stack of trashcan assemblies, each trashcan assembly of the nested stack corresponding to the trashcan assembly of FIG. 6.

Nesting of the trashcan assembly 210 is illustrated in FIG. 12. As described above with regard to the trashcan assembly 10, the recessed areas formed by the peripheral wall 216 of one trashcan assembly 210 accommodate the internal projections of the same recessed areas of another trashcan assembly when stacked therein, whereby a stable stack of a plurality of trashcans assemblies 210 is achieved.

Figure 11:
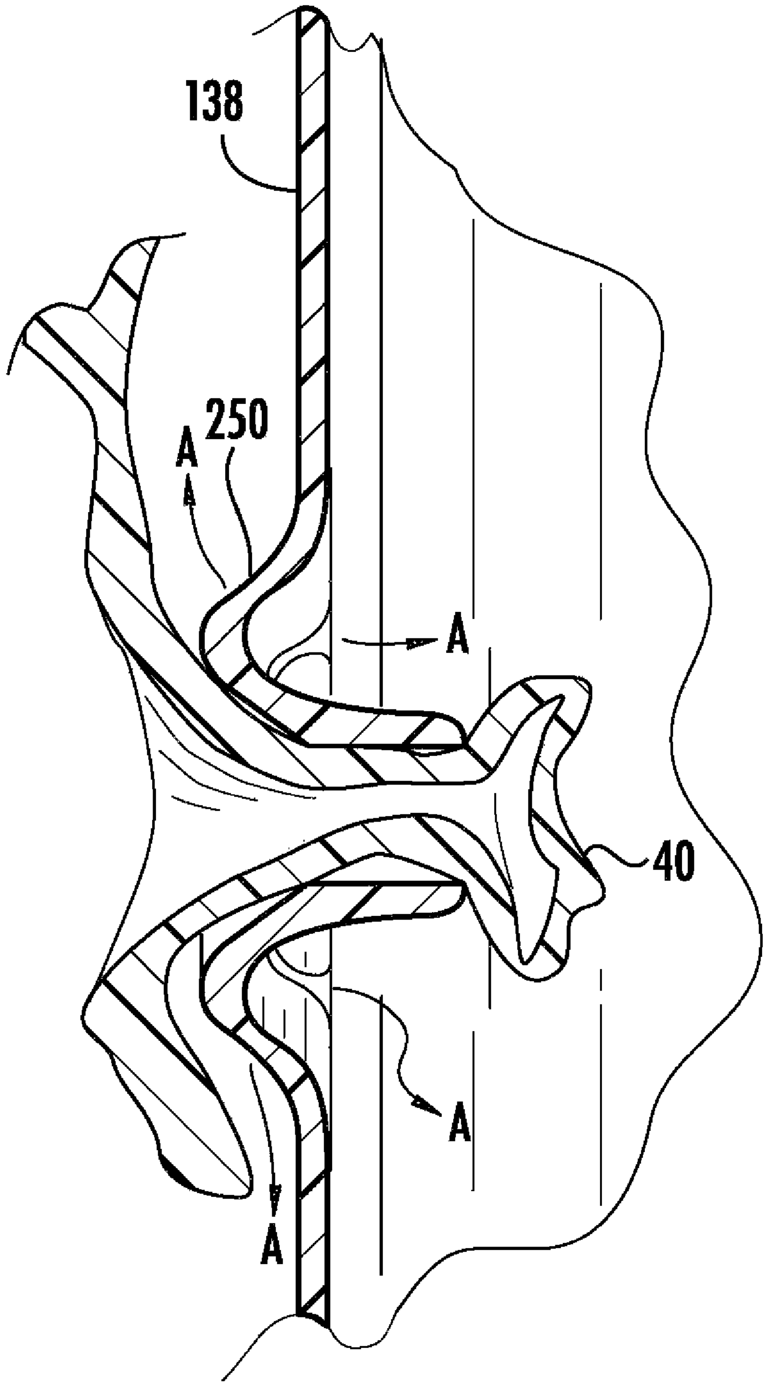

FIGS. 8-11 illustrate the use of the bag retention member 138 in accordance with an aspect of the invention. Specifically, FIGS. 8-11 are cross-sectional views similar to FIG. 7 collectively showing the insertion and retention of a portion 40 of a trash bag. To insert the portion 40 of the trash bag through the trash bag retention member 138, a user engages the portion 40 of the bag with the tip of a finger and presses the portion 40 of the trash bag with the person's finger through the central opening 74 of the bag retention member 138, which opening 74 is surrounding by the rounded indentation. As the user presses the finger into the rounded indentation 62, the fingers 244 are biased inwardly to the interior, enclosed space of the container. After the finger and the portion 40 of the bag have been inserted completely through the retaining component 138, the finger is withdrawn. During withdrawal of the finger, the fingers 244 grasp the portion 40 of the bag 20 that has been pressed there through and prevent it from withdrawing back through the bag retention member 138 with the finger. When the finger is removed, the pressure exerted thereby is released from the fingers 244, and the fingers 244 return to their original orientation, essentially closing passage through the bag retention member 138 by the portion 40 of the trash bag that has been inserted therethrough. FIG. 11 is a cross-sectional view of the trash bag retention member 138 with the portion 40 of the trash bag 20 retained thereby. As illustrated in FIG. 11, air may flow through the vents 250 as shown by arrows A. As indicated above, the vents 250 allow air that has become trapped between the trash bag 20 and the container 12 to escape so that the trash bag 20 may lie flat against the peripheral wall 216. The vents 250 also permit air flow into the container, which occurs, for example, when the trash bag is removed from the container.

Manufacturing Methods

In a preferred method of manufacturing the trashcan assembly, the container and the bag retention members are comolded in two injection molding steps. In general, in this process, a first part is injection molded using a first material. Thereafter, the molded part is placed into a second mold, and the second part is injection molded in the second mold using a second material. The second material, when injected into the second mold, comes into contact with and bonds to the first part. When the second material covers the first material, this process is sometimes referred to as overmolding. In this manufacturing process for making the trashcan assembly, it is preferred that the first material be polypropylene and that the second material be GLS G7960 Styrenic TPE. Trashcan assemblies including the bag retention members 136,138 are representative of this manufacturing process.

In an alternative manufacturing method, of which the trashcan assembly 10 of FIGS. 1A-3D is representative, the method includes separate injection molding of the container 12 and the trash bag retention member 38. The container 12 is injection molded in a conventional manner, but is made to include apertures 118. The trash bag retention member 38 is separately manufactured by injection molding the frame and injection molding the panel to the frame in a comolding process. Panel insert 80 is thereby formed and is thereafter attached to the trashcan container 12 within the apertures 118. The panel insert 80 forming the bag retention member 38 may be adhered to the container 12 using, for example, chemical bonds, thermowelding, or mechanical bonds, as desired. The panel insert 80 further may include only a simple snap-fit attachment, or both such an attachment in combination with some form of additional or reinforcing adherence of the panel 80 to the container 12. Any adhesion technique that forms a sufficiently strong bond between the container 12 and the panel insert 80 may be utilized.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A method of manufacturing a trashcan, comprising (a) forming a container having a base and a peripheral wall extending upwardly from the base, the peripheral wall and the base defining an interior space of the container for receiving a trash bag, wherein an aperture is formed in the peripheral wall;

(b) forming a trash bag retention member including flexible, resilient fingers arranged about an opening and configured to grasp and retain a portion of a trash bag when the trash bag portion is inserted through the opening, the trash bag retention member defining a peripheral channel that at least partially bounds the arrangement of fingers; and (c) attaching the trash bag retention member to the container by positioning the retention member within the aperture formed in the peripheral wall such that a portion of the peripheral wall is received within the channel, and such that the portion of the trash bag that is inserted through the opening of the trash bag retention member is received within the interior space of the container;

(d) wherein the trash bag retention member is attached to the container such that the peripheral wall and the trash bag retention member each define part of a rim of the trashcan.

2. The method of claim 1, wherein the trash bag retention member is attached to the container with a mechanical bond.

3. The method of claim 1, wherein the trash bag retention member is attached to the container with a chemical bond.

4. The method of claim 1, wherein the trash bag retention member is thermowelded to the container.

5. The method of claim 1, wherein the step of attaching the trash bag retention member to the container includes snapping the trash bag retention member into place within the aperture.

6. The method of claim 1, wherein the container is formed with a plurality of apertures and a plurality of trash bag retention members are formed for attaching to the apertures.

7. The method of claim 1, wherein the aperture is formed adjacent a rim of the container.

8. The method of claim 1, wherein the step of forming the container comprises molding the container.

9. The method of claim 8, wherein the molding comprises injection molding.

10. The method of claim 1, wherein the step of forming the trash bag retention member comprises comolding a frame and a flexile, resilient panel to the frame.

11. The method of claim 10, wherein the molding comprises injection molding the frame and injection molding the panel to the frame, wherein the frame is formed from a first material and the panel is formed from a second, different material.

12. The method of claim 11, wherein the step of forming the container comprises injection molding the container.

13. The method of claim 12, wherein the container is formed from a third material different from the first and second materials.

14. The method of claim 12, wherein the container is formed from the second material from which the frame is formed.

15. The method of claim 1, wherein the aperture is U-shaped.

16. A method of manufacturing a trashcan, comprising (a) forming a container having a base and a peripheral wall extending upwardly from the base, the peripheral wall and the base defining an interior space of the container for receiving a trash bag, wherein an aperture having a U-shaped perimeter is formed in the peripheral wall at a top of the peripheral wall;

(b) forming a trash bag retention member including flexible, resilient fingers arranged about an opening and configured to grasp and retain a portion of a trash bag when the trash bag portion is inserted through the opening, the trash bag retention member defining a peripheral channel that at least partially bounds the arrangement of fingers; and (c) attaching the trash bag retention member to the container by positioning the retention member within the aperture formed in the peripheral wall such that a portion of the peripheral wall is received within the channel, and such that the portion of the trash bag that is inserted through the opening of the trash bag retention member is received within the interior space of the container.

* * * * *

UNITED STATES PATENT AND TRADEMARK OFFICE

CERTIFICATE OF CORRECTION

PATENT NO. : 7,641,835 B2
APPLICATION NO. : 11/424968
DATED : January 5, 2010
INVENTOR(S) : Ramsey et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 488 days.

Signed and Sealed this

Sixteenth Day of November, 2010

David J. Kappos
*Director of the United States Patent and Trademark Office*